(12) United States Patent
Campora et al.

(10) Patent No.: US 11,502,935 B2
(45) Date of Patent: Nov. 15, 2022

(54) INTER-MESH NETWORKS ROUTING PROTOCOL

(71) Applicant: Pycom Ltd, Guildford (GB)

(72) Inventors: Daniel Campora, Guildford (GB); Catalin-Virgil Ioana, Guildford (GB)

(73) Assignee: PYCOM LTD.

( * ) Notice: Subject to any disclaimer, the term of this patent is extended or adjusted under 35 U.S.C. 154(b) by 151 days.

(21) Appl. No.: 16/899,730

(22) Filed: Jun. 12, 2020

(65) Prior Publication Data

US 2020/0396153 A1 Dec. 17, 2020

(30) Foreign Application Priority Data

Jun. 13, 2019 (EP) .................................... 19179963

(51) Int. Cl.
| | |
|---|---|
| *H04L 12/721* | (2013.01) |
| *H04B 17/336* | (2015.01) |
| *H04L 12/66* | (2006.01) |
| *H04W 84/18* | (2009.01) |
| *H04L 45/12* | (2022.01) |

(52) U.S. Cl.
CPC ......... *H04L 45/124* (2013.01); *H04B 17/336* (2015.01); *H04L 12/66* (2013.01); *H04W 84/18* (2013.01)

(58) Field of Classification Search
CPC ..... H04L 45/124; H04B 17/336; H04W 84/18
See application file for complete search history.

(56) References Cited

U.S. PATENT DOCUMENTS

| | | | |
|---|---|---|---|
| 6,963,575 B1* | 11/2005 | Sistanizadeh | H04L 12/4625 370/408 |
| 7,957,277 B2 | 6/2011 | Roy et al. | |
| 2008/0008178 A1* | 1/2008 | Tychon | H04L 45/36 370/392 |
| 2016/0373996 A1* | 12/2016 | Yang | H04L 12/5691 |
| 2018/0062879 A1* | 3/2018 | Alexander | H04W 40/32 |
| 2019/0081884 A1* | 3/2019 | Spohn | H04L 45/124 |
| 2019/0104202 A1* | 4/2019 | Reynolds | H04L 69/14 |
| 2019/0253341 A1* | 8/2019 | Timmons | H04L 67/141 |
| 2020/0267641 A1* | 8/2020 | Strong | H04W 24/02 |
| 2020/0367133 A1* | 11/2020 | Matsuura | H04W 40/04 |

OTHER PUBLICATIONS

Extended European Search Report for corresponding European application No. 19179963.4; dated Nov 19, 2019 (9 pages).

* cited by examiner

*Primary Examiner* — Brian D Nguyen
(74) *Attorney, Agent, or Firm* — Mendelsohn Dunleavy, P.C.

(57) ABSTRACT

A computer-implemented method determines a routing cost for routing data over a routing path between a first device in a first network and a second device, wherein the routing path has a path segment between a gateway device of the first network and a device in a second network, the gateway device being configured to establish a connection between the first and second networks. This method may include determining a routing cost for the path segment, the routing cost for the path segment having a default routing cost value that is based on capabilities of the gateway device and/or the communication technology; and determining the routing cost for the routing path based on the routing cost for the path segment. The invention furthermore relates to determining a route based on the routing cost, and to routing a data packet based on the route.

18 Claims, 7 Drawing Sheets

INTER-MESH NETWORKS ROUTING PROTOCOL

FIELD OF THE INVENTION

The disclosure relates to a method for determining a routing cost for routing data. The disclosure further relates to a device for routing data and a computer program product.

BACKGROUND

The discussion below is merely provided for general background information and is not intended to be used as an aid in determining the scope of the claimed subject matter.

The Internet of Things is growing fast. As a result, many devices will be able to connect to each other and form a mesh network through which data packets can be routed. Preferably, several of the devices in this mesh network have a connection to the internet, which allows devices in the mesh network to exchange data with devices in other networks.

Prior art teaches various algorithms to determine the quality of a route between nodes in a mesh. For example, U.S. Pat. No. 7,957,277 B2 'Wireless communication method and system for routing packets via intra-mesh and extra-mesh routes' teaches a method to determine a route between two nodes in a mesh network. In particular, it discloses a method for routing in a mesh network, some nodes of which can also exchange information with each other through a second network. The routing method involves choosing between possible routes, wherein some of the possible routes lead through this second network. This method uses information, e.g. delay differences and number of hops, gathered by probe packages being sent between source and destination nodes.

It is a drawback of this method that gathering the required information requires time and other resources. It will be understood that preferably the quality of a routing path is determined quickly so that an appropriate routing path can be selected quickly for fast routing.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, the invention relates to a computer-implemented method for determining a routing cost for routing data over a routing path between a first device in a first network and a second device, wherein the routing path comprises a path segment between a gateway device of the first network and a device in a second network, the path segment comprising a connection between the first and second networks, the gateway device being configured to establish a connection between the first and second networks using a communication technology. This method may comprise: determining a routing cost for said path segment, the routing cost for said path segment having a default routing cost value that is based on capabilities of the gateway device and or the communication technology; and determining the routing cost for the routing path based on the routing cost for the path segment. Said method may be performed by software running on a programmable device. This software may be provided as a computer program product.

The inventors have recognised that it may be beneficial to determine a routing cost (which may be used to select one of various possible routing paths), from a device in a first network to a device in a second network, without having to send probing packets or other information over the second network. Each probe package that is being sent, consumes resources such as bandwidth and energy, which may be very scarce. Hence, determining a routing costs without having to send probe packages may save on traffic and hence bandwidth, on computing power, on power consumption, et cetera. Furthermore, not having to send probe packets saves time and allows routing decisions to be made fast. To this end, the gateway devices, i.e. the devices in the first network that may be configured to connect to the second network and may be configured to route data packets from the first to the second network, may be provided with a default routing cost value for the routing cost for the routing path segment between the gateway device and a device in the second network, that depends on the capabilities of the gateway device. In the context of this application, a default routing cost of a routing path segment may be defined as a routing cost that may be determined without probing the routing path segment. Typically, the default routing cost depends only on the capabilities of the device whence the routing path segment originates. Generally, the default routing cost is the same for all routing path segments originating at one device.

This method is particularly relevant when there is more than one gateway device in the first network, and the first device needs to select a gateway device out of a plurality of gateway devices to transmit a data packet to a device in the second network, preferably without having extensive knowledge of the second network.

A routing cost for a path as used herein may be understood to indicate any parameter or variable on which a routing decision may be based, including but not limited to: number of hops, bandwidth, delay, reliability, load, or even financial costs, as well as combinations thereof. A routing cost may also be e.g. an arbitrary number determined by a network administrator. Typically, a routing cost is related to the transmission time and/or transmission reliability of a datagram over a network.

It may be noted that the default routing cost according to this method is independent of the specific device in the second network at the end of the path segment. The routing costs for the path segment may be understood to be a routing cost for a routing path segment from the gateway device to an arbitrary device in the second network. Hence, the routing cost for the routing path may depend only on a routing segment in the first network and on the gateway device. Consequently, each time a device in the first network determines a routing cost for a path at least partly through a second network, it can proceed without having knowledge of the actual configuration and characteristics of the second network.

In an embodiment, the default routing cost value is based on at least the communication technology (e.g. WiFi, UMTS, LTE, Bluetooth) which the gateway device is configured to use for connecting with the second network for routing the data over said path segment. In many cases, the communication technology is the main distinctive factor to choose between a plurality of gateways.

In an embodiment, the gateway device may have more than one connection with the second network; that is, the gateway device may be configured to connect to the second network through at least a first connection, using a first communication technology (e.g. WiFi), and through a second connection, using a second communication technology (e.g. LTE). In such an embodiment, the routing cost may have a first default routing cost value for a path segment comprising the first connection, the first default routing cost value being based on the first communication technology; and the routing cost may have a second default routing cost value for a path segment comprising the second connection, the second default routing cost value being based on the second communication technology.

In an embodiment, the determining the routing cost for the routing path may comprise determining an operating routing cost value, the operating routing cost value being based on the default routing cost value and an adjustment value, the adjustment value being based on measured parameters indicative of characteristics of the gateway device and/or on measured parameters indicative of characteristics of the connection between the gateway device and the second network. For example, when there is more than one possible routing path, using e.g. different gateway devices or different connections through the same gateway device, having similar costs, it may be desirable to choose the connection with e.g. the highest signal strength or quality, or the gateway with the most reliable power supply. Typically, the adjustment value will be considerably smaller than the default routing cost value, e.g. adjustment value may be constrained to be at least a factor 2 smaller than the default routing cost value.

In an embodiment, the routing path may comprise a further routing path segment between the first device and the gateway device, and the method for determining a routing cost may further comprise: determining a further routing cost for the further path segment based on link costs, the link cost associated with link depending on at least one of: a Received Signal Strength Indicator (RSSI) associated with the link, Signal to Noise Ratio (SNR), power supply of a sending and/or receiving device, and amount of traffic over a link; and determining the routing cost for the routing path based on the routing cost for the path segment and based on said further routing cost. A link may be a communication connection between a sending and a receiving device. In a typical example, a link cost is determined for each link in the further routing path segment, and the further routing cost is obtained by combining, usually summing, the link costs for each link in the further routing path segment.

In an embodiment, the routing path may comprise a further routing path segment between the first device and the gateway device, and the method may further comprise determining a further routing cost for the further routing path segment, wherein the routing cost for the path segment and the further routing cost are compatible. The routing cost for the entire routing path between the first device and second device may then be determined by combining, preferably summing, the routing cost for the path segment between the gateway device and the second device, and the further path segment between the first device and the gateway device. In a typical embodiment, the possible default values for the path segment, that are based on the capabilities of the gateway device, are based on the routing metric used for routing in the first network. For instance, the default routing cost associated with a gateway device may be based on the expectation value of the routing cost metric of the first network comprising a predetermined number of hops.

In an embodiment, the first network may be a mesh network and/or the second network may be the Internet. The method according to the invention is especially relevant when the first and second networks are appreciably different, for instance, if the bandwidth in the first network is at least an order of magnitude smaller than the bandwidth in de second network, or if the transmission in the first network consumes considerably more resources than transmission in the second network. Similarly, in a typical embodiment, the second network will be the cloud, and devices in the first network are primarily interested in getting a signal to the cloud using the best path.

In an embodiment, the method may be a method for determining a routing cost for routing data over a routing path between a first device in a first network and a second device in a third network, wherein the routing path comprises a path segment between a gateway device of the first network and an intermediate device in a second network and a third path segment between the intermediate device and a second gateway device of the third network, the gateway device of the first network connecting the first and second networks, and the second gateway device of the third network connecting the second and third networks. In such an embodiment, the method may further comprise: determining a third routing cost for the third path segment, the third routing cost having a second default routing cost value that is based on capabilities of the second gateway device, and determining the routing cost for the routing path based on the routing cost for the path segment and on the third routing cost. In an embodiment, the first network and the third network may be the same network.

The destination device need not be in the second network; instead, it may be in a third network, or even in a different part of the first network. In an embodiment where the second device is in the first network, a routing decision may have to be made whether to use a routing path entirely through the first network, or to use a routing path which goes partly through the second network. In such an embodiment, it is especially relevant that the routing cost for the path segment through the second network be comparable with the routing cost for the alternative route through the first network; for instance both the link costs within the second network and the default routing cost values for the segment costs may be expressed as 4-bit integers. In some embodiment, a route from a first network to a second network and back again to the first network may comprise a first cost for the connection between the sending gateway device and the second network and for the connection between the second network and the receiving gateway device; in other embodiments, only the sending gateway may contribute to the routing cost.

In an embodiment, the method may further comprise: storing, in a database, the routing cost for the routing path and/or the path segment in association with information identifying the first device and in association with information identifying the gateway device. In a typical embodiment, a cloud database may be configured to store information identifying one or more devices in a first network in association with information identifying, for each of the one or more devices, the gateway device that offers the lowest routing cost for a routing path between the cloud and the device, the routing cost determined according to any of the above-mentioned method steps. This way, a device routing a packet to a device in the first network may select the optimal gateway to use as point of entry into the first network, by querying the cloud-accessible database.

In some embodiments, the routing cost may be symmetric, i.e., the routing cost from a first device to a second device is the same as the routing cost from the second device to the first device. This is typically the case when the sending and receiving devices are similar. In other embodiments, the routing cost may be asymmetric, i.e., the routing cost from a first device to a second device may be different from the routing cost from the second device to the first device. This can e.g. be the case when the sending and receiving devices are very dissimilar; for example receiving a signal from a satellite may be given a very different link cost than sending a signal to that same satellite.

In an embodiment, the method may further comprise: determining an alternative routing cost for routing data over an alternative routing path between the first device in the first network and the second device. In a typical situation, there is more than one possible route between the first device and the second device, and it may be desirable to compare the routing costs of various routing paths.

In an embodiment, the alternative routing path may comprise an alternative path segment between the gateway device of the first network and the device in the second network, the alternative path segment comprising an alternative connection between the first and second networks, the gateway device being configured to use an alternative communication technology to establish the alternative connection. In such an embodiment, the method may further comprise determining an alternative routing cost for said alternative path segment, the alternative routing cost for said alternative path segment having an alternative default routing cost value based on the alternative communication technology. The determining the alternative routing cost may be based on the routing cost for the alternative path segment.

A gateway device may be able to connect the first and second networks using different communication technologies, e.g. both using a WiFi connection and using an LTE connection. In such a case, a routing path segment comprising a connection using the first communication technology (e.g. WiFi) may form a first routing path segment with a first default routing cost value based on the first connection, while a routing path segment comprising a connection using the second communication technology (e.g. LTE) may form a second routing path segment with a second default routing cost value based on the second communication technology.

In an embodiment, the method may further comprise determining a route for routing data between a first device in a first network and a second device, the method comprising: determining for a first routing path a first routing cost using any of the above-mentioned method steps; determining for a second routing path a second routing cost, optionally using any of the above-mentioned method steps; and determining the route based on the first and second routing costs. Determining a routing cost for a routing path is particularly relevant if there is more than one routing path that might be selected between a first and second device, as in such a case, the routing cost may be use to select the optimal routing path. This is typically the routing path with the lowest routing path. Preferable, the same metric should be used to determine the routing cost for each possible routing path. If different metrics are used to determine a routing cost for different routes, these metrics should preferably be compatible or be made compatible, such that a comparison of the routing paths yields meaningful information about the different routing paths.

In an embodiment, the method may further comprise routing a packet between a first device in a first network and a second device, the method comprising: determining a routing path between the first device and the second device using the above-mentioned method; and routing the packet using said route. Evidently, selecting a routing path is particularly advantageous if the selected routing path is subsequently used to route a data packet.

In a further aspect, the invention relates to a computer program or suite of computer programs comprising at least one software code portion or a computer program product storing at least one software code portion, the software code portion, when run on a computer system, being configured for performing any of the above-mentioned method steps.

In a further aspect, the invention relates to an electronic device comprising at least one processor configured for performing any of the above-mentioned method steps.

In an embodiment, the electronic device may further comprise an indicator configured to indicate a connection strength based on the routing cost of the routing path with the lowest routing cost from the electronic device to the second network determined according to the above-mentioned method steps. Such an indicator may serve to inform a user of the device whether the connection to the cloud is strong and/or reliable. If such is not the case, this may prompt the user to remedy the situation by e.g. moving the device to a different location, adding additional devices, checking networking parameters, etcetera.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores a software code portion, the software code portion, when executed or processed by a computer, being configured to perform executable operations comprising: allowing a user of a first device to request transmission of a message, obtaining a location of a second device, and transmitting said message to devices within a certain range of said second device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre, cable, RF, etc., or any suitable combination of the foregoing. Computer program code for carrying out operations for aspects of the present invention may be written in any combination of one or more programming languages, including an object-oriented programming language such as Java™, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

DETAILED DESCRIPTION OF THE DRAWINGS

Figure 1A:
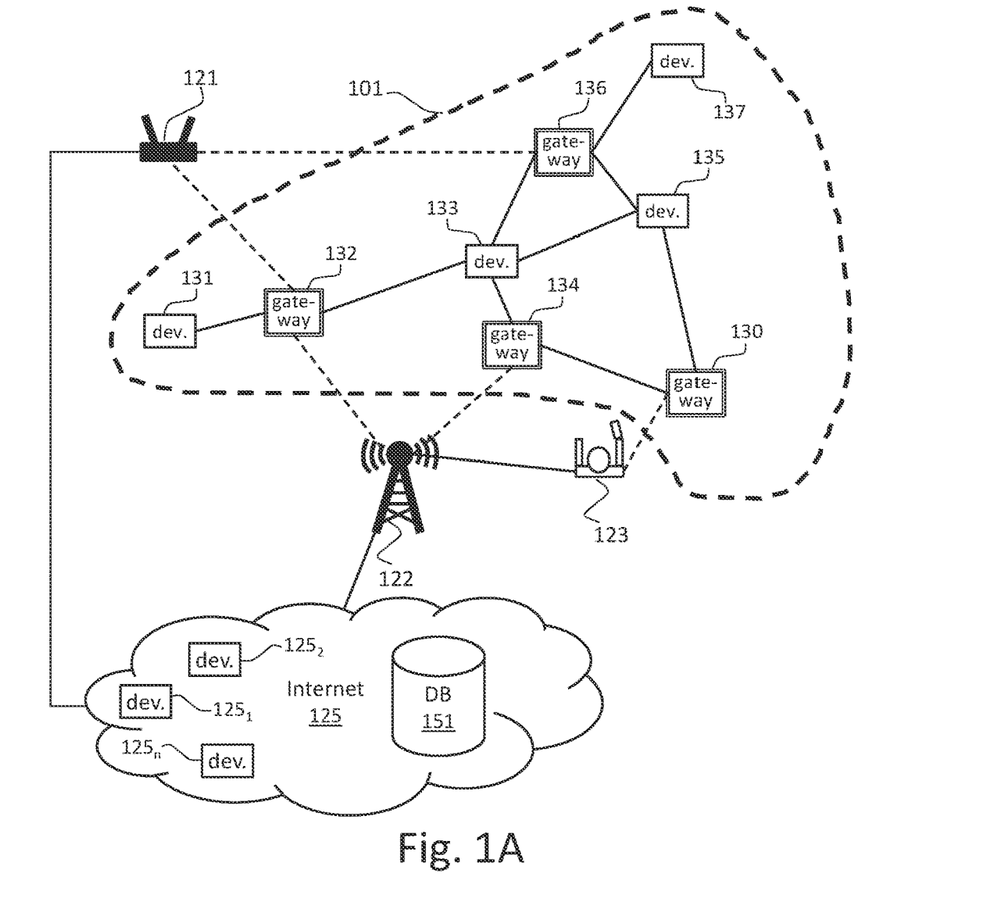
FIG. 1A depicts an example of a situation in which the invention may be used, including mesh devices and infrastructure devices.

FIG. 1A shows an example of a situation in which the invention may be used. A first network 101, in this example a mesh network or a sub-mesh of a mesh network, comprises a plurality of devices, in this example eight mesh devices 130-137. A mesh network may be understood to be a network topology in which the infrastructure nodes, such as devices described herein, connect directly, dynamically and non-hierarchically to as many other nodes as possible and cooperate with one another to efficiently route data. A mesh network typically does not depend on a single node which allows every node to participate in the relay of information. Preferably, mesh networks dynamically self-organize and self-configure. Mesh topologies may be contrasted with star/tree local network topologies in which the nodes are directly linked to only a small subset of other nodes, and the links between these infrastructure neighbours are hierarchical.

Within a mesh network, a sub-mesh may be defined. In one example, a sub-mesh may be formed by all nodes that are within a certain distance from a particular device, or alternatively, from each other. Preferably, a distance between two nodes as referred to herein may be expressed by a routing cost. Alternatively, a sub-mesh may be formed by all devices within a mesh that are within a certain geographical area. Hence, a sub-mesh may be defined relative to an individual node, with each node in a mesh defining a possibly different sub-mesh, or a sub-mesh may be defined relative to a group of nodes, with each node in the group defining the same sub-mesh. In some instances, a sub-mesh may comprise all nodes in a mesh and thus be identical to the mesh.

In the mesh network of FIG. 1A, all mesh devices route data as well as the infrastructure devices 121-123. In an alternative embodiment, only certain types of mesh devices route data. All devices in the mesh network, be they devices that route data or not, may be referred to as nodes of the mesh network. In the embodiment of FIG. 1A, the mesh devices are able to communicate with each other using Long Range (LoRa) wireless technology. In an alternative embodiment, a different wireless technology may be used.

The embodiment of FIG. 1A comprises three infrastructure devices that each are configured to connect the network 101 and to devices in a second network 125, in this example the Internet 125. Infrastructure devices 121-123 may be considered to form a part of the second network. An infrastructure device may be a device such as, for instance, a wireless LAN Internet access point 121, a base station 122 of a cellular communication network, e.g. an UMTS, LTE or CDM2000 network, or a mobile phone 123, itself connected to the second network 125, e.g. the Internet, through base station 122. In the embodiment of FIG. 1A, the (sub)mesh 101 is communicatively connected to the Internet; in a different embodiment, the (sub)mesh 101 may be connected to a different type of network, e.g. a LAN network, private WAN network, or any other type of network.

A gateway device may be understood to be a device within the mesh network, which device is connected to an infrastructure device. A gateway device is typically configured to communicate with devices in a first network using a first communication protocol and to communicate with devices in a second network, different from the first network, using a second communication protocol, different from the first communication protocol. In the depicted example, there are two gateway devices 132,136 in the first sub-mesh 101 that are connected to the LAN Internet access point 121, two gateway devices 132,134 that are connected to the base station 122, and one gateway device 130 that is connected to Internet-connected mobile phone 123 using e.g. a Bluetooth connection; one of these gateway devices, device 132, is connected to both the LAN Internet access point 121 and to the base station 122.

A mesh device is typically able to transmit data to multiple other mesh devices, but it is not required to transmit data to multiple other mesh devices. For example, a mesh device may always transmit to the other mesh device from which the strongest signal is received. The solid lines between the mesh devices shown in FIG. 1A represent that these mesh devices are within range of each other and are able to communicate directly with each other. A dashed line between a gateway device and an infrastructure device represents that this gateway device is connected to this infrastructure device or is able to connect to this infrastructure device. The connection between two nodes may also be referred to as a link. In the example of FIG. 1A, links between nodes are always bidirectional, that is, if device A can transmit to device B, device B can also transmit to device A. In mesh networks were all devices use similar hardware, this is typically the case. In other examples, it may not be the case.

In the example of FIG. 1A, mesh device 130 is able to transmit to mesh devices 134 and 135, mesh device 131 is able to transmit to mesh device 132, mesh device 132 is able to transmit to mesh devices 131 and 133, mesh device 133 is able to transmit to mesh devices 132, 134, 135 and 136, mesh device 134 is able to transmit to mesh devices 130 and 133, mesh device 135 is able to transmit to mesh devices 130, 133, and 136, mesh device 136 is able to transmit to mesh devices 133, 135, and 137, and mesh device 137 is able to transmit to mesh device 136.

A first device, e.g. mesh device 133, instructed to send a data packet to a second device, e.g. cloud-accessible database 151, has many possible routing paths to choose from, e.g. those listed in Table 1. One example for a routing path from mesh device 133 to device 151 is 133-132-121-125-151. It should be noted that although the cloud 125 has been indicated with a single number, a path through the cloud usually consists of many hops between different devices $125_1$-$125_n$. The path from one infrastructure device to a device in the cloud may be different, i.e. comprise a different set of intermediate devices $125_1$-$125_n$, than that from another infrastructure device; for instance, the path from LAN Internet access point 121 to cloud-accessible database 151 may be different from the path from base station 122 to cloud-accessible database 151. Above-mentioned routing path comprises a first path segment 133-132 in the first network 101 between source device 133 and gateway device 132, and a second path segment 132-121-125-151 between the gateway device 132 and device 151 in the second network.

Figure 1B:
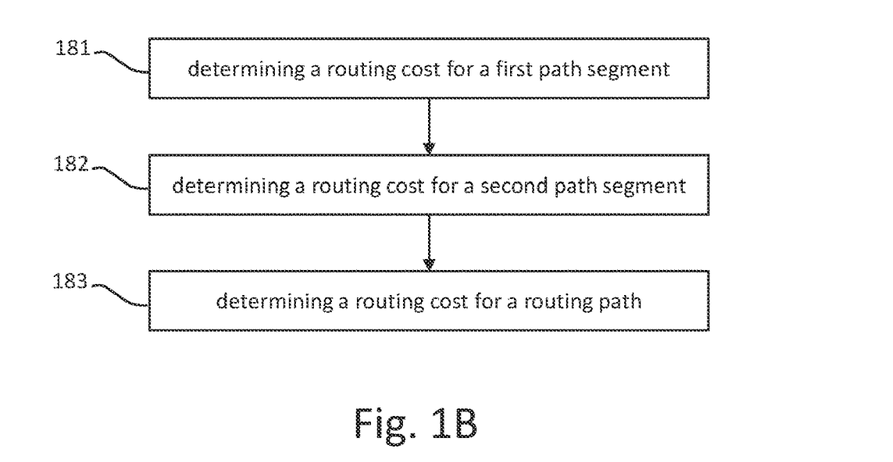
FIG. 1B illustrates an embodiment of the computer-implemented method.

Then, device 133 may execute a method for determining a routing cost for routing data over the above-mentioned routing path, which method is illustrated by FIG. 1B. In a first optional step 181, device 133 may determine a first routing cost for the first routing path segment 133-132. In a second step 182, device 133 may determine a second routing cost for the path segment 132-121-125-151 between gateway device 132 in the first network 101 and device 151 in the second network. This second routing cost may have a default value based on capabilities of the gateway device 132. For example, the default value for the second routing cost may be based on the communication technology that the gateway device is configured to use for communicating with a device outside the first network, in this example the WiFi connection, e.g. using a communication protocol conform standard IEEE 802.11n, between gateway device 132 and infrastructure device 121.

In an embodiment, the default value for the second routing cost may be independent of the details of the path segment 121-125-151. Consequently, device 133 may determine a second routing cost for the second path segment, without using information from or about devices not in the first network 101. In particular, device 133 may determine a routing cost for the second path segment without e.g. sending a probe packet over the second path segment. In a third step 183, device 133 may determine a routing cost for the routing path 133-132-121-125-151 based on the second routing cost for the second path segment and optionally also on the first routing cost for the first path segment. A more elaborate description of this method is given with reference to FIG. 6.

Typically, in this example, device 133 preferably routes the data packet in the most efficient manner possible. To do so, device 133 may determine a plurality of possible routing paths, and for each of the plurality of possible routing paths, a routing cost for routing data over the routing path between device 133 and device 151 may be determined. Each of these routing paths comprises a routing path segment in the mesh network, i.e. from (source) device 133 to a gateway device, and a path segment outside the mesh network (comprising a part through the cloud), from the gateway device to (destination) device 151. Similarly, a routing cost for the routing path between device 131 and device 151 may comprise a routing cost for the path segment between device 131 and the gateway device in that particular routing path, and a routing cost for the path segment from the gateway device and device 151. Device 131 may then select a route out of said plurality of possible routing paths, based on the routing cost associated with each routing path. This will be explained in more detail with reference to FIG. 2.

TABLE 1

Figure 2:
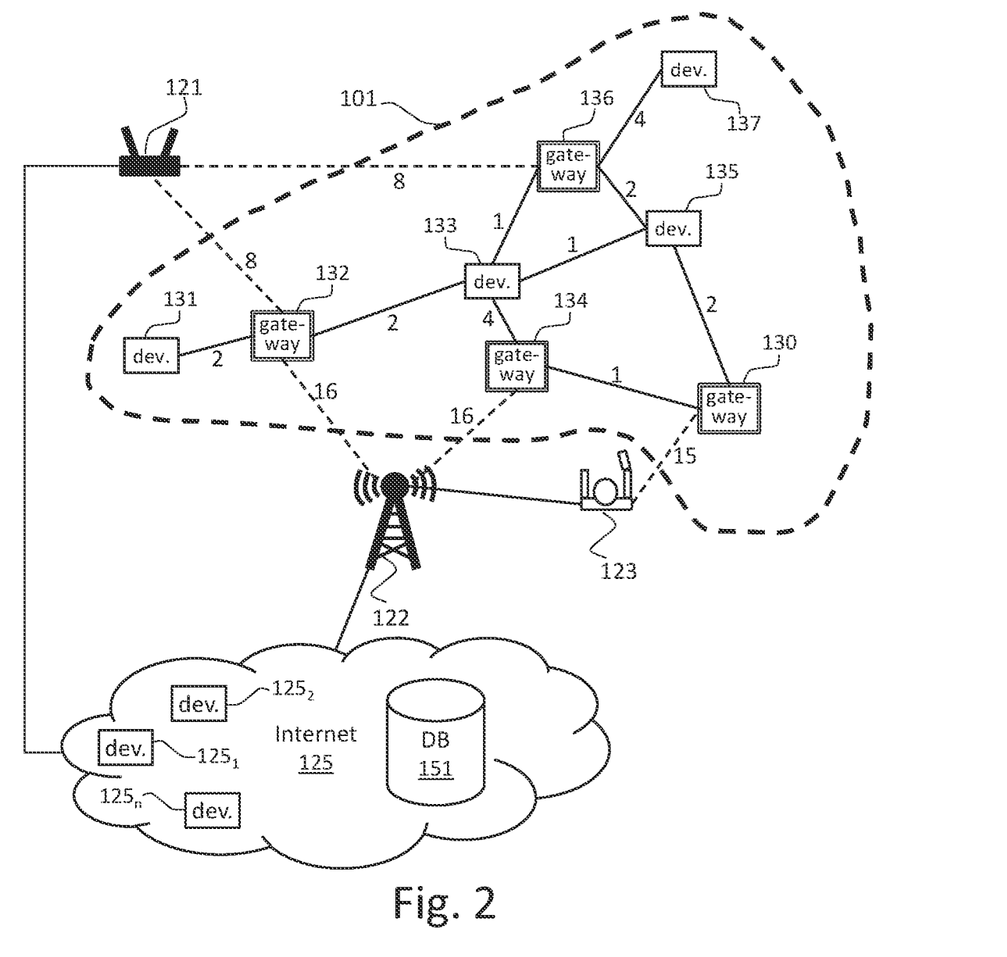
FIG. 2 depicts the sub-mesh of FIG. 1A, with link costs assigned to links inside or touching the sub-mesh.

A selection of possible routing paths with associated routing costs for a data packet between mesh device 133 and cloud-accessible database 151 as depicted in FIG. 2.

| # | $1^{st}$ path segment (in mesh) | $2^{nd}$ path segment (outside mesh) | total cost |
|---|---|---|---|
| 1 | 133 - 132 - | - 121 - 125 - 151 | 10 |
| 2 | 133 - 132 - | - 122 - 125 - 151 | 18 |
| 3 | 133 - 136 - | - 121 - 125 - 151 | 9 |
| 4 | 133 - 134 - | - 122 - 125 - 151 | 20 |
| 5 | 133 - 135 - 130 - | - 123 - 122 - 125 - 151 | 18 |
| 6 | 133 - 134 - 130 - | - 123 - 122 - 125 - 151 | 20 |
| 7 | 133 - 135 - 130 - 134 - | - 122 - 125 - 151 | 20 |

FIG. 2 shows the mesh network 101, with a link cost associated with each link between two mesh devices 130-137, and with links between gateway devices 130, 132, 134, 136 and infrastructure devices 121-123.

The routing cost within the mesh network 101 may be determined by a first algorithm. In an embodiment, the first algorithm may combine, e.g. sum, link costs of all links on a route between a source device and a gateway device. In a different embodiment, the first algorithm may comprise the product of the number of hops of a path and the lowest or highest link cost of all links in the path between source device and gateway device. The link cost may e.g. be based on the Received Signal Strength Indicator (RSSI), the Signal to Noise Ratio (SNR), the amount of traffic at a node, the power source of a node (e.g. battery-powered or not), the power level of a node (in particular for battery-powered nodes), or combinations thereof.

In an embodiment, the link cost may be computed based on RSSI and SNR of the (radio) connection of the link and the Radio Sensitivity (RS) of the receiving radio. First, a Signal Strength (SS) may be determined as: if SNR>5 dB, then SS=0 dB; else SS=RSSI+SNR dB. Next, the Link Margin (LM) may be computed as: LM=SS−RS. The link margin may be updated with each transmitted package, e.g. using a running average as follows: LM_avg_new=7/8 LM_avg_old+1/8 LM_new. Instead of using the computed parameter values, tables combining ranges of parameter values into single numbers may be used; for instance, a link cost may be based on a link margin, according to Table 2.

TABLE 2

Link cost value associated with link margin value.

| Link margin | Link cost |
|---|---|
| >20 dB | 1 |
| >10 dB | 2 |
| >2 dB | 4 |
| ≤2 dB | 32 |

The first algorithm may also be based on the Thread protocol as described in 'Thread 1.1.1 Specification, Feb. 13, 2017', published by the Thread Group on https://www-.threadgroup.org/. Alternatively, the link cost may also be based on a round trip time of e.g. ACK or status messages.

The inventors have recognised that in many cases, it is sufficient for a mesh device to know to which gateway to send a data packet, as the routing in the cloud is taken care of by devices not belonging to the mesh network. Additionally, bandwidth outside the mesh network may be orders of magnitude larger. It is also recognised that the connection from the gateway device to an Infrastructure device is especially relevant, as there may be considerable differences between various connection types, in for example required power, bandwidth, or cost.

Therefore, while sending data between mesh devices may consume relatively little resources, this may be different for sending data from the mesh network to a device outside the mesh network. It is therefore preferable to determine a routing cost for a routing path segment between a gateway device and a cloud device, without having to send probe packets into the cloud. This aim may be achieved by determining a routing cost for a path segment from a gateway device to a second device, not in the first network, based on the capabilities of the gateway device. Consequently, a default routing cost value may be attributed to the routing path segment from a gateway device to a device in a second network, e.g. the cloud, based on the capabilities of the gateway device.

A device determining a routing cost may determine an adjustment value, based on measured parameters indicative of characteristics of the gateway device, e.g. power source parameters, and/or on measured parameters indicative of characteristics of the connection between the gateway device and the second network, e.g. amount of traffic or signal quality. For example, the adjustment value may be based on e.g. information about previously sent or received data packets. The device may then determine an operating value, based on the aforementioned default routing cost value and the adjustment value. The device may then determine a routing cost for the path segment between the gateway device and the device in the second network based on said operating routing cost value. Typically, the adjustment value should be smaller than the default value.

In an embodiment, the default routing cost value is based on at least the communication technology (e.g. WiFi, UMTS, LTE, Bluetooth), which the gateway device is configured to use for connecting with the second network for routing the data over the path segment between a gateway device of the first network and a device in a second network. In the embodiment of FIG. 2, WiFi connections 136-121, 132-121 have link cost 8, LTE connections 132-122, 134-122 have link cost 16, and a Bluetooth connection 130-123 to an LTE connected device 123 has link cost 15. Preferably, the routing cost for the path segment within the first network, e.g. between the source device and the gateway device, should be compatible. For example, the default value for a path segment between a gateway device and a device in the second network may be comparable to a minimum, average, expected, or maximum value of the routing metric used for routing in the first network for a path segment within the first network comprising a certain number of hops. For instance, if a mesh link cost has on average value 2, a WiFi connection has cost 8, and an LTE connection has cost 16, then a WiFi connection is (on average) preferred over an LTE connection if the WiFi gateway is less than 4 mesh hops further than the LTE gateway.

Each node in the network may store the path to the second network with the lowest cost. In an embodiment, the node comprises an indicator, e.g. an LED, indicating whether the node has access to the cloud through a gateway device, and preferably also indicating the routing cost of the cheapest path to the cloud. Optionally, the indicator may also comprise information on alternative paths to the cloud, e.g. information about the second cheapest path. Preferably, this also comprises information about the presence of back-up gateways.

In the example depicted in FIG. 2, the routing cost is symmetric, i.e. the routing cost from a first node to a second node is the same as the routing cost from the second node to the first node. In other embodiments, the routing cost may be asymmetric. For example, as sending a signal typically requires more power than receiving a signal, a node's battery status may be comprised only in the link cost for links in which said node acts as an antenna, but not where it acts as a receiver. Similarly, a link cost metric based on bandwidth, may be asymmetric due to the upload bandwidth being different from the download bandwidth, as is the case in e.g. ADSL connections.

Figure 3:
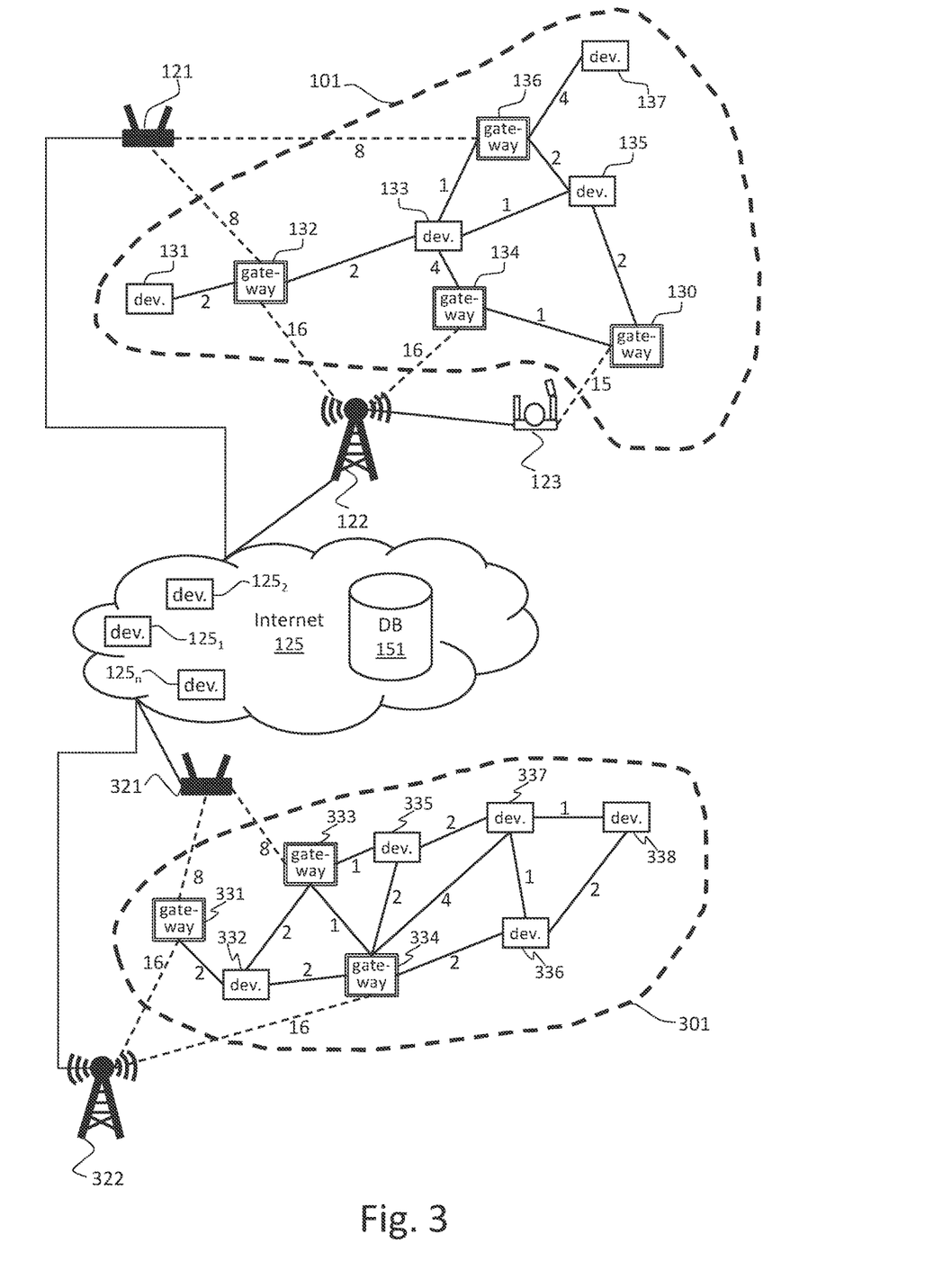
FIG. 3 depicts the sub-mesh of FIG. 1A, connected through the cloud to a second sub-mesh.

FIG. 3 depicts the mesh network 101 of FIG. 1A, connected through the cloud to a second mesh network 301. Eight devices 331-338 form a second mesh network 301. Two infrastructure devices 322,321 are connected to gateway devices 331, 333, 334: a wireless LAN Internet access point 321 is connected to gateway devices 331,333 and a base station 322 of a cellular communication network, e.g. an UMTS, LTE or CDM2000 network, is connected to gateway devices 331 and 334.

In the example of FIG. 3, the nodes in sub-mesh 101 form a first part of the mesh network and the nodes in sub-mesh 301 form a second part of the mesh network. Sub-meshes 101,301 may e.g. be spatially separated parts of the mesh. The two parts are connected via the Internet 125. User nodes are either directly connected to the Internet, e.g. via one or more infrastructure devices, or they are able to communicate with devices on the Internet, e.g. Internet server 151, via other mesh devices. User nodes in one part of the mesh network are able to communicate with user nodes in another part of the mesh network via the Internet 125. The different parts of the mesh network could also be considered to be different mesh networks.

A cloud-accessible database may be created, comprising information on the cheapest point of access for a mesh node, that is, the gateway through which a selected node in a mesh network can be reached with the lowest routing cost from a device within the cloud to the selected node. Preferably, the database comprises such information for every node in a mesh network. Optionally, the database comprises also the associated routing cost. The routing cost from a mesh node to the cloud may be the same as the routing cost from the cloud to mesh node, or may be different, depending on the choices made for the routing cost metric.

In an embodiment comprising such a database, a device routing a packet to a mesh node may select the optimal gateway to use as point of entry into the mesh, by querying the cloud-accessible database.

Figure 4:
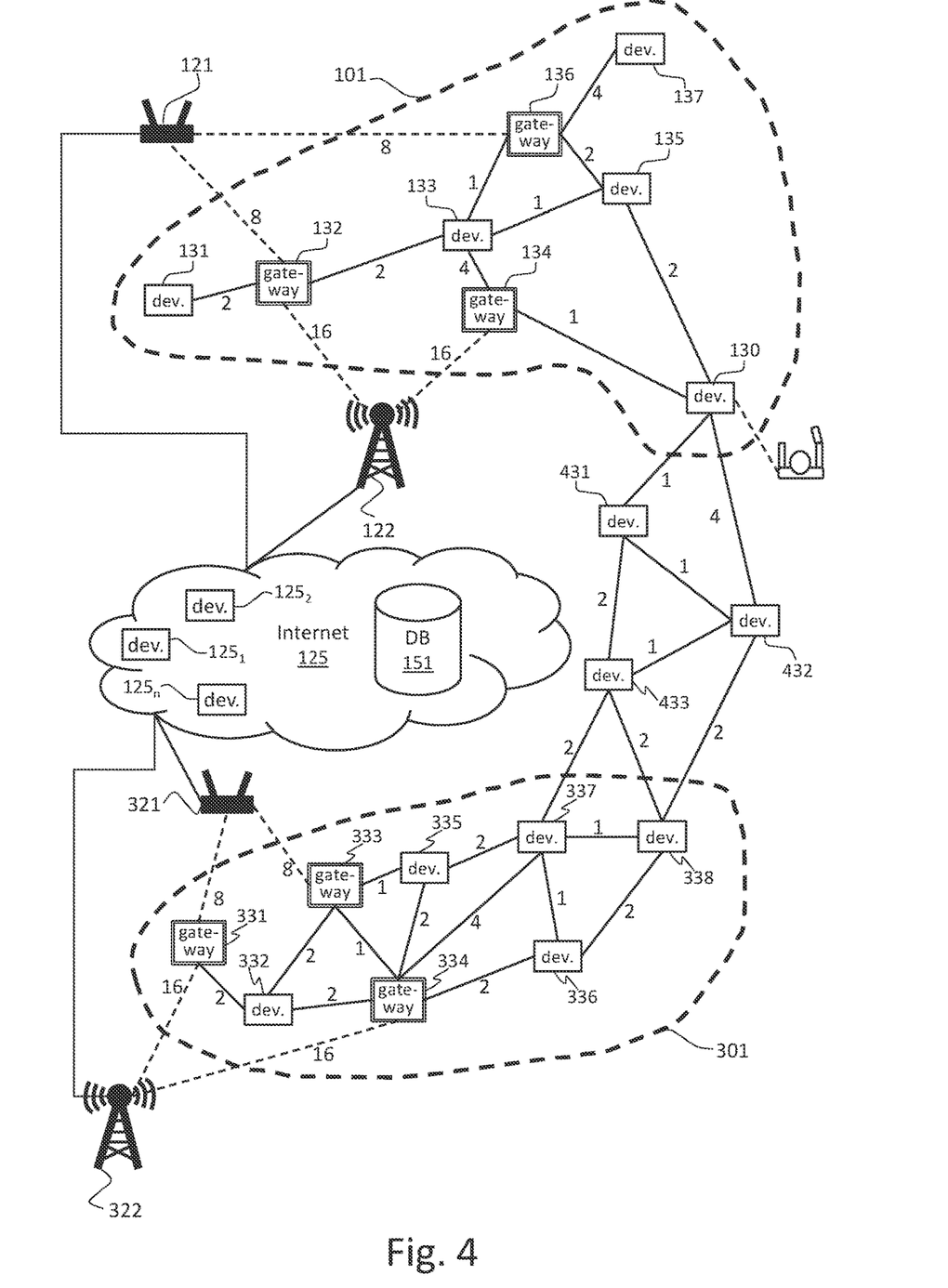
FIG. 4 depicts the sub-meshes of FIG. 3, where the sub-meshes are comprised in a larger mesh.

FIG. 4 depicts the meshes of FIG. 3, where the meshes are comprised in a larger mesh. Sub-meshes 101 and 301 are connected both through the cloud 125 and through mesh devices 431-433. Mobile phone 123 has lost its connection to base station 122, and as a consequence, mesh device 130 is no longer a gateway device, as it is not connected to the cloud via a routing path not comprising mesh links.

In this example, a data packet being sent from mesh device 131 to mesh device 331 could take the so-called extra-mesh route 131-132-121-125-321-331, having total cost 18, or the so-called intra-mesh route 131-132-133-135-130-431-433-337-335-333-332-331, having total cost 19. In this example, a routing algorithm minimizing the routing path cost, would choose the extra-mesh route. In some embodiments, the cost for the route segment 125-321-331 may be queried from database 151, e.g. by gateway device 132.

In this example, device 131 may execute a method for determining a routing cost for routing data between device 131 and device 331 over the extra-mesh route, comprising a first path segment 131-132 within the first sub-mesh 101 between source device 131 and first gateway device 132; a second path segment 132-121-$125_1$ between first gateway device 132 and an intermediate device, in this example device $125_1$, in the second network 125 (in this example the cloud); and a third path segment $125_1$-321-331 between the intermediate device 125, in the second network and second gateway device 331 in second sub-mesh 301. In this example, the destination device is a gateway device, in different examples there might be a fourth path segment between the second gateway device and a different destination device. Said method may comprise determining first and second routing costs for the first and second path segments, respectively, according to the method explained above, e.g. with reference to FIG. 1B; determining a third routing cost for the third path segment $125_1$-321-331, having a default routing cost based on capabilities of the second gateway device 331; and determining a routing cost for the routing path 131-132-121-$125_1$-321-331 based on the first, second, and third routing costs. As this routing cost is independent of the intermediate device $125_1$, it may also be considered the routing cost for any routing path 131-132-121-125-321-331.

Similarly, a data packet being sent from mesh device 131 to mesh device 332 could take extra-mesh route 131-132-121-125-321-331-332, having total cost 20, or the so-called intra-mesh route 131-132-133-135-130-431-433-337-335-333-332, having total cost 17. In this example, a routing algorithm minimizing the routing path cost, would choose the intra-mesh route.

In some embodiments, a sub-mesh may be defined relative to each node, comprising all nodes with which there is an intra-mesh connection with e.g. less than a certain cost or with less than a certain number of hops. For instance, a sub-mesh might be defined relative to each node, by all nodes having an intra-mesh connection having a routing cost of less than 16. Nodes 331,332 would then not be in the same sub-mesh as node 131 and node 131 might be unaware of the intra-mesh route (as the routing cost is larger than or equal to 16), and choose to send the data packet via the extra-mesh route.

However, in some embodiments, each mesh node along the routing path might first check whether it is aware of the destination node, and if so, determine the optimal route between itself and the destination route and, if this route is different, determine to reroute the data packet for the remaining part of the route. In such an embodiment, node 132 would be aware that node 332 is part of its sub-mesh, and might decide to reroute the data packet using the intra-mesh route, as intra-mesh route segment 132-332 has routing cost 15, whereas the extra-mesh route segment 132-332 has routing cost 18.

Figure 5:
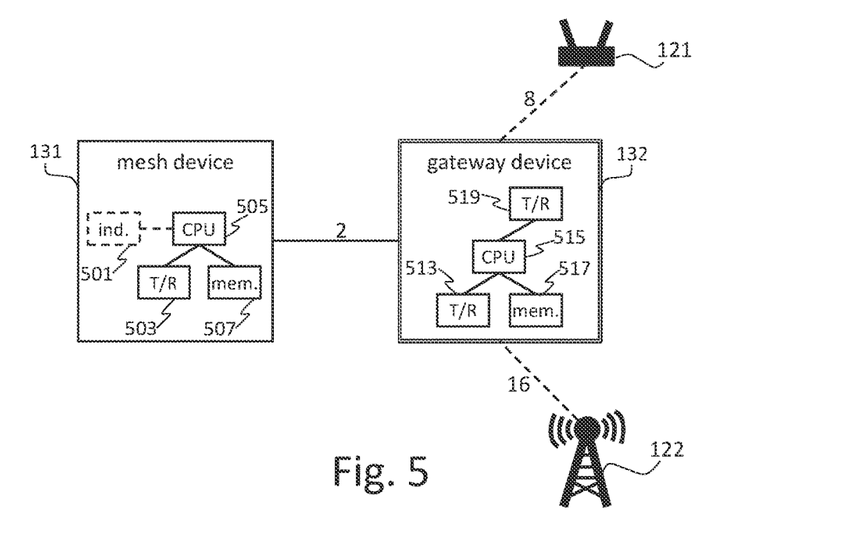
FIG. 5 is a block diagram of an electronic device according to an embodiment of the invention.

An embodiment of the electronic device of the invention is shown in FIG. 5. In FIG. 5, a data packet is transmitted from mesh device 131 to gateway device 132, which forwards the data packet to LAN Internet access point 121 or base station 122. The mesh device 131 comprises a processor 505, a transceiver 503 and a memory 507. The mesh device 132 comprises a processor 515, a first transceiver 513, a second transceiver 519, and a memory 517, for example. The first transceiver 517 may be used to communicate, for instance, with a mesh device, e.g. mesh device 131, over a mesh protocol, while the second transceiver 519 may be used to communicate with an infrastructure device, e.g. LAN Internet access point 121 and/or base station 122, typically using a different communication protocol.

In an embodiment, the default value for a routing cost for a path segment between a gateway device 132 and a device not in the mesh, e.g. an infrastructure device 121,122, may be stored in the memory 517 of the gateway device. It may share this default value with other devices in the mesh, e.g. mesh device 131, in the same way other routing cost information is shared within the first network. That way, the same routing algorithm may be used for both intra-mesh and extra-mesh routes, effectively treating the external network (e.g. the Internet) as a single node, with a routing cost determined according to an embodiment of the invention.

In some embodiments, gateway device 132 may provide the default value upon request by a different device, while in other embodiments, the gateway may broadcast the known routing costs to its neighbours, including the default value for the connection with e.g. an infrastructure device 121, 122. In some embodiments, the gateway device may share e.g. information about its connection types, while a routing device, which may be a different device, looks up the corresponding default value, e.g. in software embedded in the routing device. In some embodiments, a gateway device 132 configured to connect to a second network using different connections may share the default routing cost associated with each of these connections; in other embodiments, only the best, e.g. the lowest, default routing cost is shared. A gateway device 132 may update a default routing cost e.g. when a new connection with the second network is established.

Optionally, device 131 may comprise an indicator 501, e.g. an LED or an LCD display, indicating the connection strength to a second network, preferably the cloud. For example, the indicator 501 might comprise an LED that is switched off or set to blink very slowly if there is no (known) connection to the cloud, indicating no connection, blink at an intermediate rate when the routing cost of the routing path to the cloud is greater than or equal to 16, indicating a poor connection, and shine continuously or visually continuously when the routing cost of the routing path to the cloud is smaller than 16, indicating a good connection. In this example, the embodiment depicted in FIG. 5 would have a good connection strength.

As an example, the indicator 501 might additionally or alternatively comprise an LCD display capable of displaying a first set of bars, indicating the strength of the connection the cloud, based on the lowest routing cost of any path from mesh device 131 to the cloud, and capable of displaying a second set of bars, indicating the strength of an alternative connection to the cloud, e.g. the routing cost of the routing path to the cloud with the second lowest routing cost. This way, a user can get an indication how reliable the connection is by having information of the best 'backup option'. In some embodiments, the alternative connection may be required to use a different gateway device to connect to the cloud than the first routing path. In some embodiments, the alternative connection may be required not to have any nodes in common with the first routing path. In some embodiments, information about the first connection and the alternative connection may be combined in a single metric, for example by taking a, possibly weighed, average. In some embodiments, the routing costs of more than one alternative route may be used to determine the connection strength.

Figure 6:
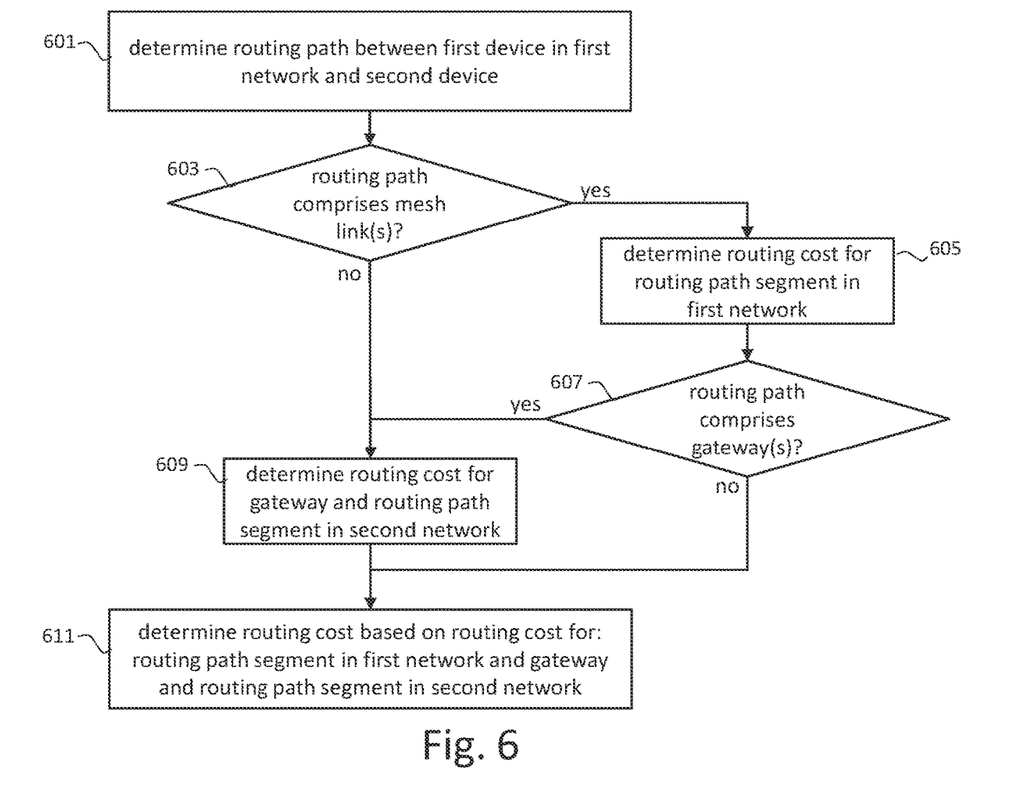
FIG. 6 is a flow diagram of an embodiment of the method of the invention.

FIG. 6 is a flow diagram of an embodiment of the method of the invention. A step 601 comprises a routing device, possibly a mesh node, determining a routing path between a device in a first network, possibly a mesh network, and a second device. The second device may be, for example, in the same (mesh) network as the first device, in a different mesh network or a different sub-mesh of the same mesh network, or in a second network, communicatively connected to the first network via a gateway device. The second device is assumed to be distinct from the first device.

A step 603 comprises determining whether the routing path comprises a routing path segment, e.g. one or more mesh links or hops, in the first network. If so, a step 605 comprises determining a routing cost for the segment or segments of the routing path through the first network. Such a path segment will typically be present, unless the first device is used as a gateway device.

A step 607 comprises determining whether the routing path comprises a gateway between the first network and a second network; if the routing path does not comprise any hops in the first network, this is necessarily the case, as the first and second devices were assumed to be distinct. If so, a step 609 comprises determining a routing cost for the routing path segment or segments between a gateway device of the first network and a device in the second network, the routing cost for said path segment having a default routing cost value that is based on capabilities of the gateway device. The device in the second network may be the aforementioned second device or an intermediate device. In the latter case, the routing path may comprise a path segment between the intermediate device and a second gateway device in e.g. a third network, or in a different sub-mesh of the first mesh network. The step 609 may then comprise determining a routing cost for the path segment between the intermediate device and the second gateway device, said routing cost having a default routing cost value that is based on capabilities of the second gateway device.

A step 611 comprises determining the routing cost for the routing path between a device in a first network and a second device, based on the routing cost determined in step 605 (if present) for the routing path segment within the first network, and the routing cost determined in step 609 (if present) for the routing path segment or segments between a gateway device of the first network and possibly of the third network, and a device in the second network. It is worth noting that at least one of the steps 605 and 609 is present in the method (the routing path comprises at least a path segment in the first network or a path segment between a gateway device and a device in a second network).

Figure 7:
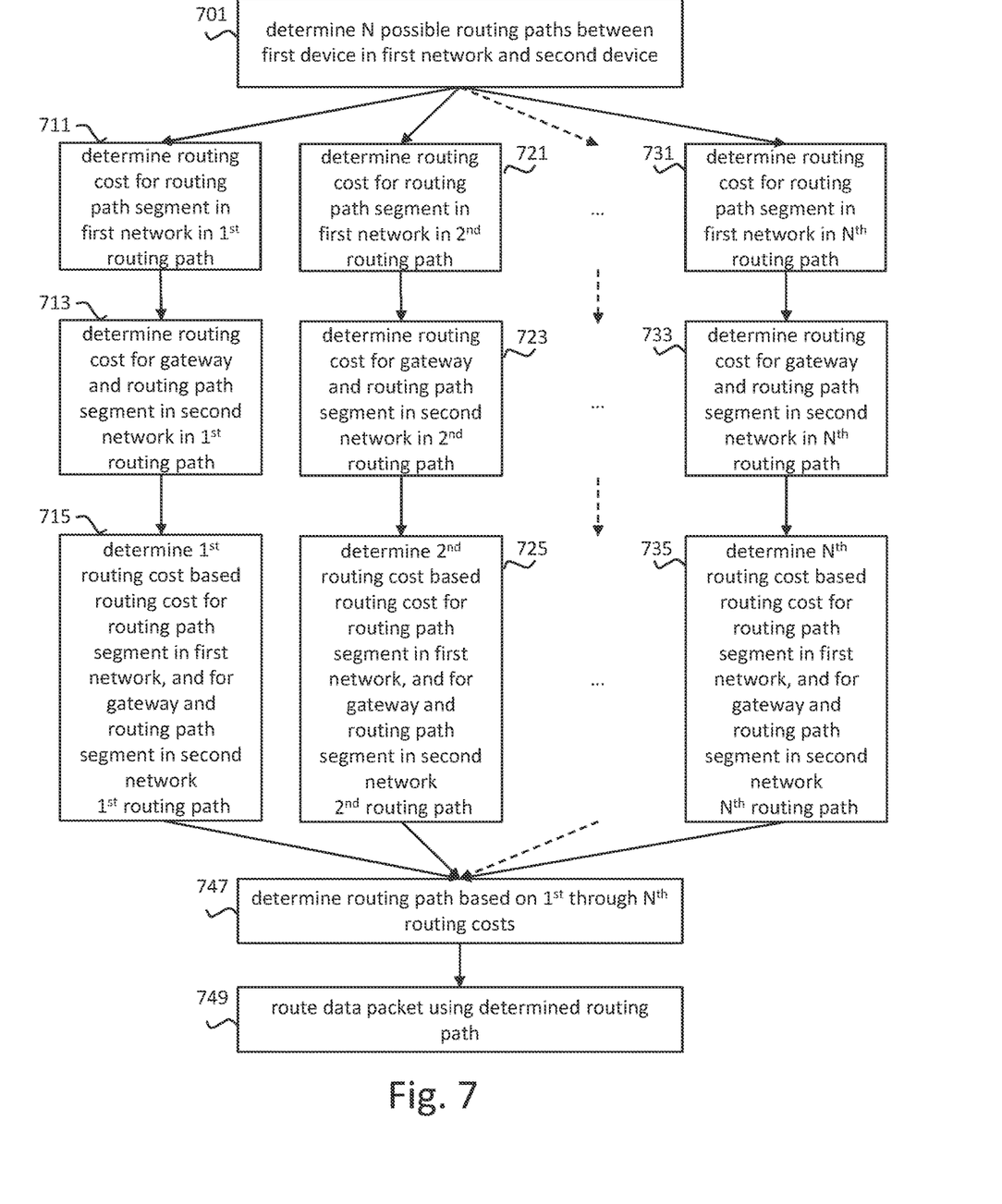
FIG. 7 is a flow diagram of another embodiment of the method of the invention.

FIG. 7 is a flow diagram of another embodiment of the method of the invention. A step 701 comprises determining a plurality of N possible routing paths between a first device in a first network and a second device. Steps 711, 713, 715 comprise determining a routing cost for a first routing path according to the method as described with reference to FIG. 6, and correspond to steps 605, 609, 611, respectively. Step 711 may be skipped when there is no path segment in the first network; similarly, step 713 may be skipped when there is no path segment through a second network, communicatively connected to the first network via a gateway device of the first network.

Steps 721, 723, 725 comprise determining a routing cost for a second routing path, analogous to the method steps 711, 713, 715 for the first routing path. Similarly, steps 731, 733, 735 comprise determining a routing cost for an $N^{th}$ routing path. In this example, the same method is used for all possible routing paths, but in some (rare) embodiments, different routing metrics may be used for different routing paths. However, according to the invention, at least one of the routing paths should comprise a path segment through a second network, communicatively connected to the first network via a gateway device of the first network, and the corresponding routing cost should have a default value, based on the capabilities of the gateway device.

A step 747 comprises determining the route based on the first though $N^{th}$ routing costs. Typically, this will comprise determining the route with the lowest associated routing cost. In some embodiments, the route with the highest associated routing cost may be preferred, and in some embodiments, yet other methods may be used to select a route from a number of possible routes, based on the associated routing cost.

Finally, a step 749 comprises routing a data packet using the route determined in step 747.

Figure 8:
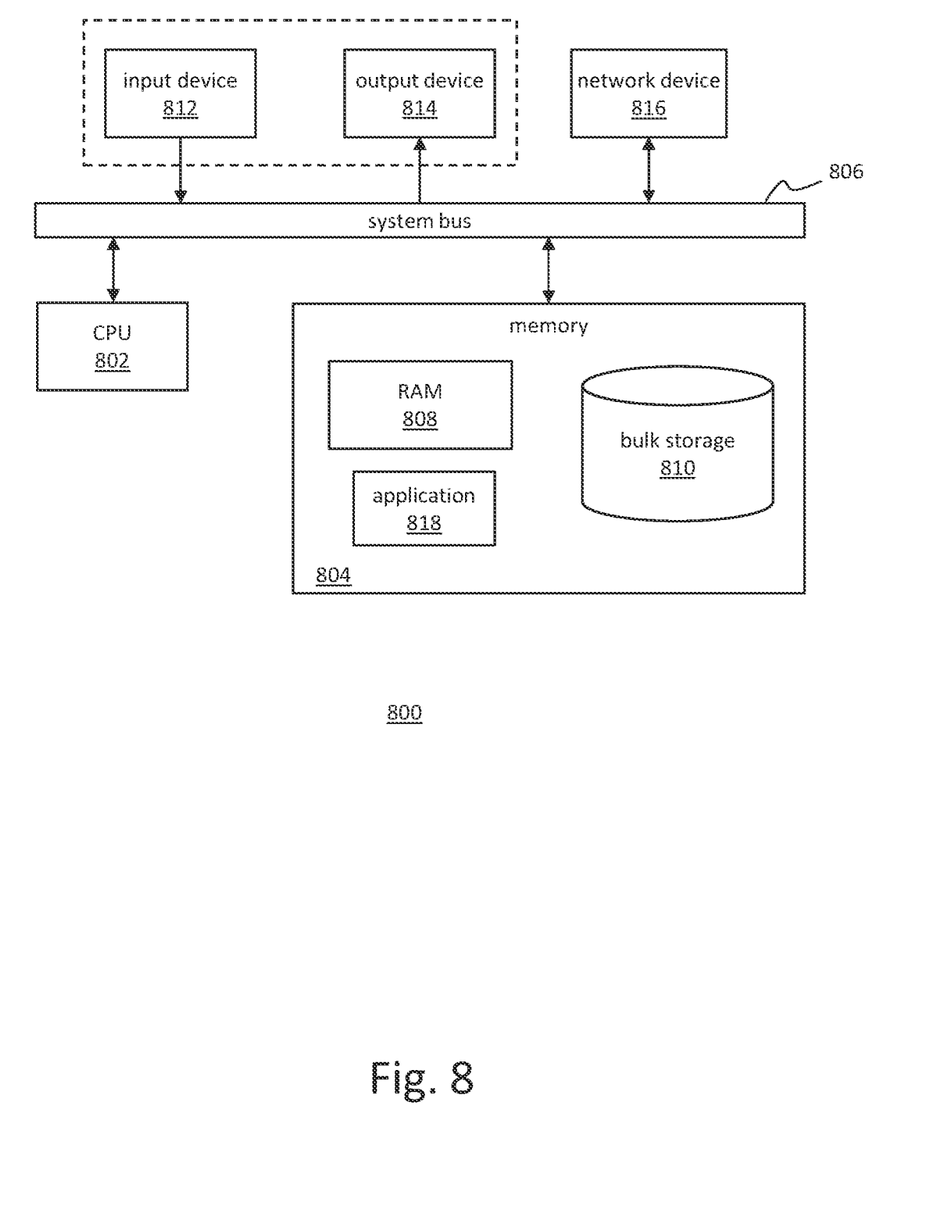
FIG. 8 is a block diagram of an exemplary data processing system for performing the methods of the invention.

FIG. 8 depicts a block diagram illustrating an exemplary data processing system that may perform the method as described with reference to FIG. 6 or 7.

As shown in FIG. 8, the data processing system 800 may include at least one processor 802 coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this specification.

The memory elements 804 may include one or more physical memory devices such as, for example, local memory 808 and one or more bulk storage devices 810. The local memory may refer to random access memory or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

Input/output (I/O) devices depicted as an input device 812 and an output device 814 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 816 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

As pictured in FIG. 8, the memory elements 804 may store an application 818. In various embodiments, the application 818 may be stored in the local memory 808, the one or more bulk storage devices 810, or separate from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 802 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

What is claimed is:

1. A computer-implemented method for determining a routing cost for routing data over a routing path between a first device in a first network and a second device, wherein the routing path comprises a path segment between a gateway device of the first network and a device in a second network, the device in the second network being either the second device or an intermediate device, the path segment comprising a connection between the first and second networks, the gateway device being configured to establish the connection between the first and second networks using a communication technology, the method comprising:
   determining a routing cost for said path segment, the routing cost for said path segment having a default routing cost value that is based on capabilities of the gateway device and/or the communication technology, the determination of the routing cost for said path segment comprising:
      determining an adjustment value based on measured parameters indicative of characteristics of the gateway device and/or on measured parameters indicative of characteristics of the connection between the gateway device and the second network; and
      determining the routing cost for said path segment based on the default routing cost value and the adjustment value; and
   determining the routing cost for the routing path based on the routing cost for the path segment.

2. The method as claimed in claim 1, wherein the routing path comprises a further routing path segment between the first device and the gateway device, the method further comprising:
   determining a further routing cost for the further routing path segment based on one or more link costs, the link cost associated with a link depending on at least one of:
      Received Signal Strength Indicator (RSSI) associated with the link,
      Signal to Noise Ratio (SNR),
      power supply of a sending and/or receiving node device, and
      amount of traffic over a link, and
   determining the routing cost for the routing path based on the routing cost for the path segment and based on said further routing cost.

3. The method as claimed in claim 1, wherein the default routing cost is based on a routing metric used for routing in the first network.

4. The method as claimed in claim 1, wherein the first network is a mesh network and/or the second network is the Internet.

5. The method as claimed in claim 1, wherein the second device is within a third network and the device in the second network is the intermediate device, and
   the routing path between the first and second device comprises the intermediate device and comprises a third path segment between a second gateway device of the third network and the intermediate device, the second gateway device being configured to connect the third and second networks, the method comprising:
   determining a third routing cost for the third path segment, the third routing cost having a second default routing cost value that is based on capabilities of the second gateway device; and
   determining the routing cost for the routing path based on the routing cost for the path segment and on the third routing cost.

6. The method as claimed in claim 5, wherein the first network and the third network are the same network.

7. The method as claimed in claim 1, further comprising:
   storing, in a database, the routing cost for the routing path and/or the path segment in association with information identifying the first device and in association with information identifying the gateway device.

8. The method as claimed in claim 1, further comprising:
   determining an alternative routing cost for routing data over an alternative routing path between the first device in the first network and the second device.

9. The method as claimed in claim 8, wherein the alternative routing path comprises an alternative path segment between the gateway device of the first network and the device in the second network, the alternative path segment comprising an alternative connection between the first and second networks, the gateway device being configured to use an alternative communication technology to establish the alternative connection, the method further comprising:
   determining an alternative routing cost for said alternative path segment, the alternative routing cost for said alternative path segment having an alternative default routing cost value based on the alternative communication technology; and
   wherein the determining the alternative routing cost for routing data over the alternative routing path is based on the alternative routing cost for the alternative path segment.

10. The method as claimed in claim 8, the method further comprising:
    selecting the routing path or the alternative routing path, based on the routing cost for the routing path and the alternative routing cost for the alternative routing path.

11. The method as claimed in claim 10, the method further comprising:
    routing a data packet using the selected routing path.

12. The method as claimed in claim 1, wherein the default routing cost value for the path segment is determined without probing the path segment and without actively measuring any connection parameter for the path segment.

13. A non-transitory computer program product storing at least one software code portion, when the software code portion is run on an electronic device, the electronic device being configured to determine a routing cost for routing data over a routing path between a first device in a first network and a second device, wherein the routing path comprises a path segment between a gateway device of the first network and a device in a second network, the path segment comprising a connection between the first and second networks, the gateway device being configured to establish the connection between the first and second networks using a communication technology, the an electronic device being configured to:
  determine a routing cost for said path segment, the routing cost for said path segment having a default routing cost value that is based on capabilities of the gateway device and/or the communication technology, the determination of the routing cost for said path segment comprising:
    determining an adjustment value based on measured parameters indicative of characteristics of the gateway device and/or on measured parameters indicative of characteristics of the connection between the gateway device and the second network; and
    determining the routing cost for said path segment based on the default routing cost value and the adjustment value; and
  determine the routing cost for the routing path based on the routing cost for the path segment.

14. The non-transitory computer program product according to claim 13, wherein the electronic device is configured to determine the default routing cost value for the path segment without probing the path segment and without actively measuring any connection parameter for the path segment.

15. An electronic device comprising at least one processor configured to determine a routing cost for routing data over a routing path between a first device in a first network and a second device, wherein the routing path comprises a path segment between a gateway device of the first network and a device in a second network, the path segment comprising a connection between the first and second networks, the gateway device being configured to establish the connection between the first and second networks using a communication technology, the electronic device configured to:
  determine a routing cost for said path segment, the routing cost for said path segment having a default routing cost value that is based on capabilities of the gateway device and/or the communication technology, the determination of the routing cost for said path segment comprising:
    determining an adjustment value based on measured parameters indicative of characteristics of the gateway device and/or on measured parameters indicative of characteristics of the connection between the gateway device and the second network; and
    determining the routing cost for said path segment based on the default routing cost value and the adjustment value; and
  determine the routing cost for the routing path based on the routing cost for the path segment.

16. The electronic device according to claim 15, wherein the electronic device is the first device.

17. The electronic device according to claim 16, further comprising an indicator configured to, after the processor determines one or more routing costs for one or more routing paths between the electronic device and the device in the second network, indicate a connection strength based on the routing cost of the routing path with a lowest routing cost from the one or more routing paths between the electronic device and the device in the second network, the one or more routing costs comprising the routing cost and the one or more routing paths comprising the routing path.

18. The electronic device according to claim 15, wherein the electronic device is configured to determine the default routing cost value for the path segment without probing the path segment and without actively measuring any connection parameter for the path segment.

* * * * *